United States Patent Office.

ALFRED KERN, OF BASLE, SWITZERLAND.

FORMATION OF PURPLE COLORING-MATTER.

SPECIFICATION forming part of Letters Patent No. 396,574, dated January 22, 1889.

Application filed April 11, 1888. Serial No. 270,284. (No specimens.)

*To all whom it may concern:*

Be it known that I, ALFRED KERN, a citizen of Switzerland, and a resident of Basle, Switzerland, have invented new and useful Improvements in Coloring-Matters, of which the following is a specification.

Ten parts of methylic ether of gallic acid and twelve parts of hydrochloric nitroso-dimethylaniline are mixed with eighty parts of methyl-alcohol, the mixture being then heated for four hours to ebullition, and well agitated. The coloring-matter forms gradually and separates as a hydrochlorate in the form of small brown needles. It is subsequently cooled, filtered from the alcohol, and washed and dried. For the purpose of purification the coloring-matter is dissolved in water, filtered, and precipitated from the filtrate with common salt.

The same coloring-matter is obtained if, in lieu of methyl-alcohol, ethyl-alcohol, or only water, is used.

The methylic ether of gallic acid may be formed by treating tannin or gallic acid dissolved in methyl-alcohol with muriatic-acid gas or with concentrated sulphuric acid, good proportions being twenty kilograms of gallic acid dissolved in fifty liters of hot methylic acid, into which solution dry muriatic gas is introduced, after which, this solution being cooled, the methylic ether of gallic acid crystallizes out. Another way of obtaining the said methylic ether is to treat forty kilograms of crystallized gallic acid and eighty kilograms of methyl-alcohol with four kilograms of sulphuric acid, boiling the same for eight to ten hours, and subsequently cooling it. Another way is by boiling together forty kilograms of tannin, eighty kilograms of methyl-alcohol, and twelve kilograms of concentrated sulphuric acid.

My new coloring-matter, which I term "prune," (plum,) shows the formula $C_{16}H_{14}N_2O_5HCl$. It dissolves in cold water and very easily in hot water. Its concentrated solutions are red violet; if they are diluted to transparency they are quite blue violet. It crystallizes out of its concentrated solutions either if they are let cool and stand, or if common salt is added. The crystals are slender and brownish brilliant, and if pressed out they are brownish brilliantly-shining scales. In methyl or ethyl alcohol of high proof the coloring-matter is hardly soluble. Very characteristic is its behavior against acids and alkalies, it showing both basic and acid properties. If a solution of the hydrochloric salt is treated with as much alkali as to bind the hydrochloric acid, the coloring-matter separates as a dark-brownish amorphous precipitate. If, however, alkali is added in excess, the coloring-matter dissolves again with a violet color, and the solution contains the alkaline salt of the coloring-matter. The process can at once be inverted again, when under the same phenomena the red-violet solution of the coloring-matter is finally obtained as a salt of an acid. If acids—for instance also hydrochloric acid—are added in excess, the solution becomes fuchsinized, but in concentrated sulphuric acid the solution is pure blue.

The coloring-matter is used for dyeing and printing cotton with mordants of most various character and wool with chrome-mordant.

Having thus described my invention and the manner of employing the same, what I claim, and wish to secure by Letters Patent of the United States of America, is—

The purple coloring-matter herein described, obtained from the methylic ether of gallic acid and hydrochloric nitroso-dimethyl-aniline, showing the formula $C_{16}H_{14}N_2O_5HCl$, having the properties of dissolving in cold water and very easily in hot water, and crystallizing out of the cooled concentrated solutions when they are allowed to cool and stand or when common salt is added, the crystals being slender and brownish brilliant, and, if pressed out, showing brownish brilliantly-shining scales, the solutions becoming fuchsine red when treated with acids and blue violet when treated with alkalies.

In testimony whereof I have signed my name to this specification in the presence of two subscribing witnesses.

ALFRED KERN.

Witnesses:
 GEORGE GIFFORD,
 CHS. A. RICHTER,